United States Patent
Koning et al.

(10) Patent No.: US 8,707,315 B2
(45) Date of Patent: Apr. 22, 2014

(54) METHOD AND SYSTEM FOR IMPLEMENTING REALTIME SPINLOCKS

(75) Inventors: Maarten Koning, Bloomfield (CA); Raymond Richardson, Richmond, CA (US)

(73) Assignee: Wind River Systems, Inc., Alameda, CA (US)

( * ) Notice: Subject to any disclaimer, the term of this patent is extended or adjusted under 35 U.S.C. 154(b) by 1043 days.

(21) Appl. No.: 12/183,174

(22) Filed: Jul. 31, 2008

(65) Prior Publication Data

US 2010/0031265 A1 Feb. 4, 2010

(51) Int. Cl.
*G06F 9/46* (2006.01)
(52) U.S. Cl.
USPC .......................................... 718/103; 718/104
(58) Field of Classification Search
None
See application file for complete search history.

(56) References Cited

U.S. PATENT DOCUMENTS

| | | | |
|---|---|---|---|
| 6,845,504 B2 * | 1/2005 | Hua et al. | 718/104 |
| 8,020,166 B2 * | 9/2011 | Ruemmler | 718/104 |
| 2002/0087769 A1 * | 7/2002 | McKenney et al. | 710/200 |

OTHER PUBLICATIONS

Diniz et al. (Dynamic Feedback: An Effective Technique for Adaptive Computing, May 1997, pp. 71-84).*

* cited by examiner

*Primary Examiner* — Andrew Caldwell
*Assistant Examiner* — George Giroux
(74) *Attorney, Agent, or Firm* — Fay Kaplun & Marcin, LLP

(57) ABSTRACT

A system and method for receiving a request from a requester for access to a computing resource, instructing the requester to wait for access to the resource when the resource is unavailable and allowing the requester to perform other tasks while waiting, determining whether the requester is available when the resource subsequently becomes available, and granting access to the resource by the requester if the requester is available.

16 Claims, 2 Drawing Sheets

METHOD AND SYSTEM FOR IMPLEMENTING REALTIME SPINLOCKS

BACKGROUND

Locks are mechanisms used to control access to computing resources with limited capacity. Spinlocks enable requesters that are waiting for access to an occupied resource to execute other threads while they are waiting. However, spinlocks may incorporate delays and inefficiencies if the locked resource is assigned to a requester that is executing other threads and unable to immediately begin using the resource.

SUMMARY OF THE INVENTION

A method for receiving a request from a requester for access to a computing resource, instructing the requester to wait for access to the resource when the resource is unavailable and allowing the requester to perform other tasks while waiting, determining whether the requestor is available when the resource subsequently becomes available and granting access to the resource by the requester if the requester is available.

A system having a computing resource, a plurality of requesters having controlled access to the resource, and a spinlock controlling access by the plurality of requesters to the resource, the spinlock receiving a request from a first requester for access to the resource, instructing the first requester to wait for access to the resource when the resource is unavailable and allowing the first requester to perform other tasks while waiting, determining whether the first requester is available when the resource subsequently becomes available, and granting access to the resource by the first requester if the first requester is available.

A system having a processor and a set of instructions executing on the processor, the set of instructions operable to receive a request from a requester for access to a computing resource, instruct the requester to wait for access to the resource when the resource is unavailable and allow the requestor to perform other tasks while waiting, determine whether the requester is available when the resource subsequently becomes available, and grant access to the resource by the requester if the requester is available.

DETAILED DESCRIPTION

Figure 1:
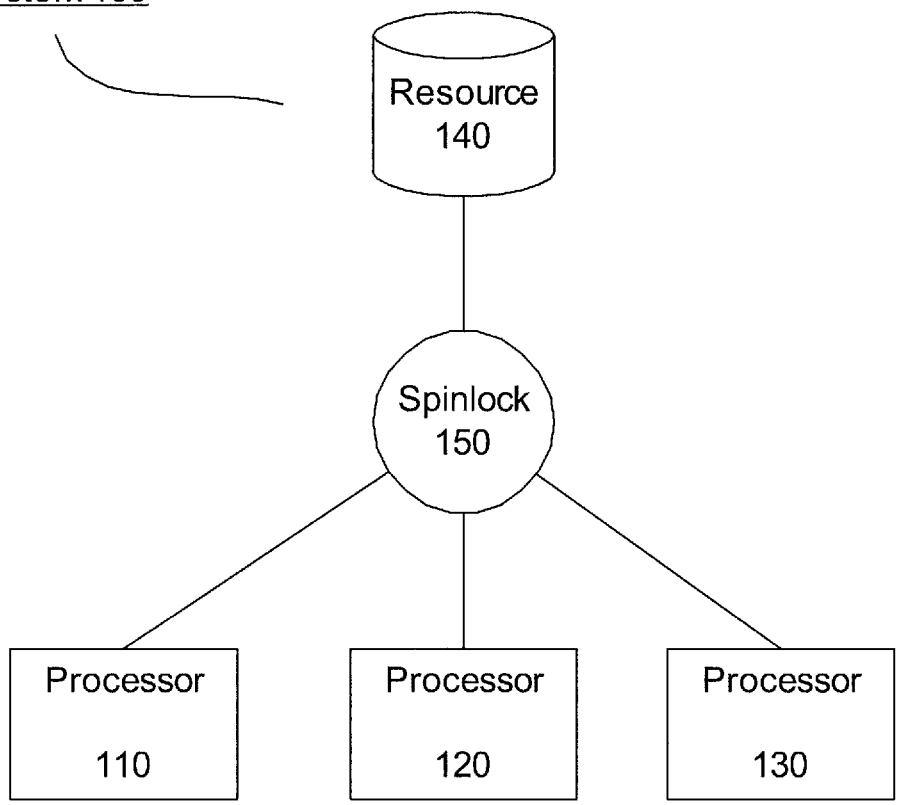
FIG. 1 shows an exemplary system including a realtime spinlock according to the present invention.

The exemplary embodiments of the present invention may be further understood with reference to the following description and the appended drawings, wherein like elements are referred to with the same reference numerals. The exemplary embodiments of the present invention describe methods and systems for optimally implementing realtime spinlocks.

In software development, a "lock" is a mechanism for enforcing limits on access to a resource in an environment where there are multiple concurrent threads of execution. Locks may be advisory, wherein each executing thread acquires the lock before accessing the corresponding data, or may be mandatory, wherein an attempt to make unauthorized access to a locked resource will force an exception.

Some software locks are "binary" or "semaphore" locks, which make no distinction between shared (i.e. read only) or exclusive (i.e. read and write) access to locked data. Other locks may implement a shared mode, wherein several threads may simultaneously access a shared lock for read-only data access. Other data access modes may also be implemented.

In addition to the above categories, locks may also be categorized in terms of what happens when a lock prevents the progress of a thread. Many locking designs block execution of a thread requesting access to a locked resource until the thread is allowed to access the resource. In contrast, a "spinlock" is a lock in which the thread simply waits (or "spins") until the locked resource becomes available. Once acquired, a spinlock will usually be held until it is explicitly released, although in some implementations it may be automatically released if the thread blocks.

Spinlocks are efficient if threads are only likely to be prevented from accessing locked resources for a short period of time, as they avoid the processing overhead that results from rescheduling processes. Thus, spinlocks are often used to control access to resources within operating system kernels. However, they may be wasteful if a lock remains in place for a long period of time, because other threads are prevented from running and require rescheduling. The longer a lock is held, the greater the risk that it will be interrupted by the O/S scheduler. If this happens, other threads that are attempting to access the resource will continue spinning (i.e., trying to obtain access to the locked resource), despite the fact that no progress is being made towards releasing the resource. This problem is exacerbated for single-processor systems, wherein each waiting thread having the same priority for access to the locked resource is likely to waste its entire allotted time slice spinning until the thread that has access to the locked resource is rescheduled.

The exemplary embodiments of the present invention provide realtime spinlocks that include policy-based access to the resource controlled by the spinlock. Each spinning processor is capable of running interrupts while spinning. Access to an available spinlock by a third party processor is not delayed while a requesting processor is busy running interrupts.

FIG. 1 illustrates an exemplary system 100 that may implement realtime spinlocks according to the present invention. The system 100 may include a plurality of processors 110, 120 and 130. The processors may be individual microprocessors that are running in parallel as part of a single computing device, may be separate microprocessors that are part of separate computing devices, may be software processes acting as processors, or may be any other similar element capable of executing processes and requesting access to resources. That is, while the term processor is used herein to describe the entity that is attempting to gain access to a resource, those skilled in the art will understand that the entity is not limited to a hardware processor, but may include any number of execution threads that may request access to the resource.

The system may also include a resource 140, access to which is controlled by a spinlock 150. The resource 140 may be any resource that has limited capacity and thus may have its accessibility limited. Examples of shared resources that may have their access controlled by spinlocks may include shared memory space, peripherals (e.g., device drivers), etc. The spinlock 150 may operate in accordance with the exemplary method 200 described below and illustrated in FIG. 2.

Figure 2:
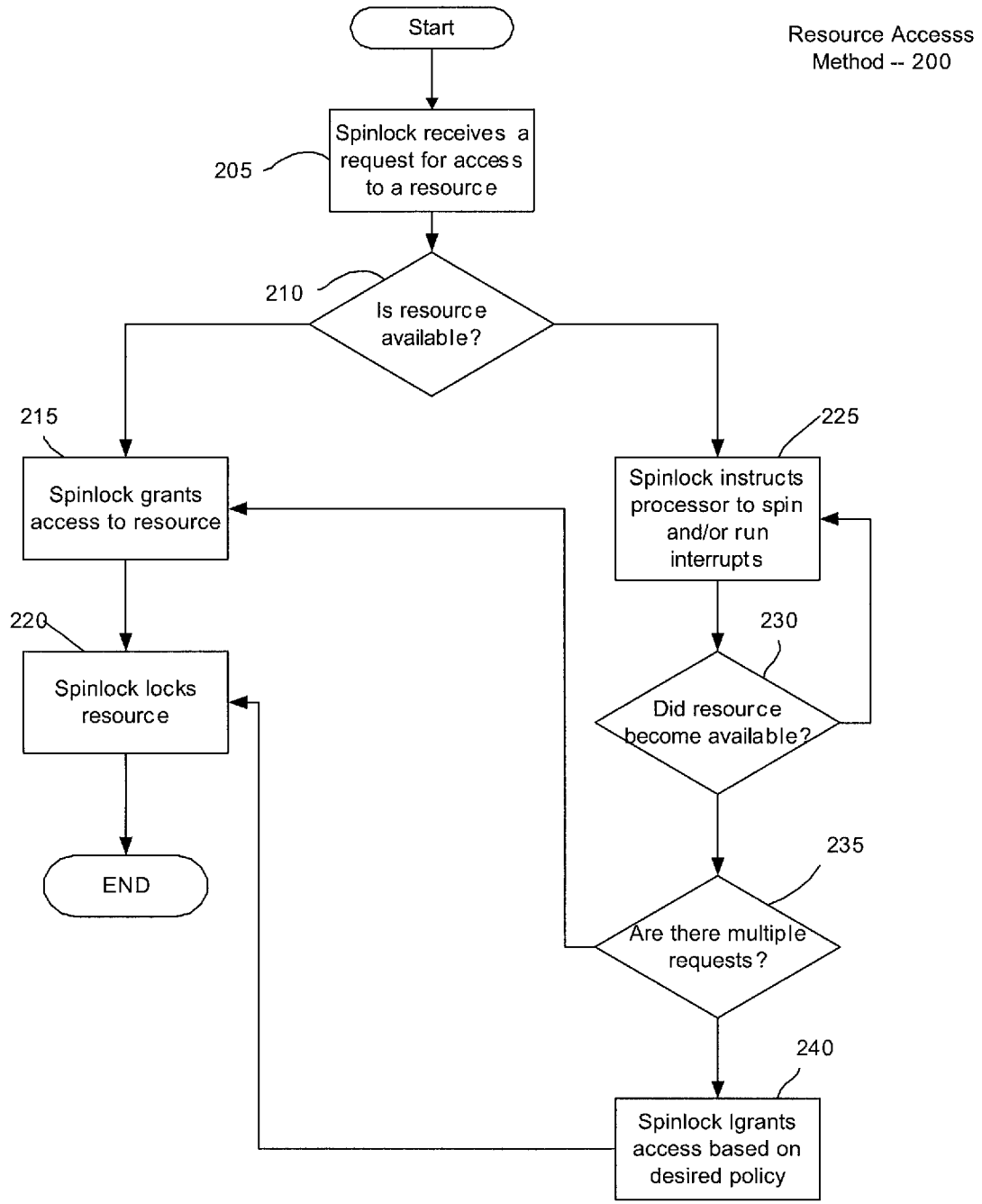
FIG. 2 shows an exemplary method for implementing realtime spinlocks according to the present invention.

FIG. 2 illustrates an exemplary method 200 for implementing a realtime spinlock according to the present invention. The method 200 will be described with reference to the exemplary system 100 of FIG. 1; however, those of skill in the art will understand that this is only exemplary and that the method 200 may be implemented by various other systems as well.

In step 205, the spinlock 150 receives a request for access to the resource 140, which it controls. The request may be made by, for example, the processor 110. In step 210, the spinlock 150 determines whether the resource 140 is available, e.g., is the resource 140 currently being accessed by either one of processors 120 or 130. Those of skill in the art will understand that since the spinlock 150 controls access to the resource 140, the spinlock 150 is the programming entity that is aware of whether the resource is available. If the resource 140 is available, the method proceeds to step 215 where the spinlock 150 grants access to the resource 140 by the requesting processor 110. Access may be granted for as long as the processor 110 needs to use the resource 140, for a fixed period of time, for a predetermined amount of time after the spinlock 150 receives a subsequent request for access to the resource 140, or for any other desirable period of time. After the access has been granted, the spinlock 150 locks the resource in step 220 so that additional processors (or execution threads) may not gain access to the resource 140. Thus, if the resource 140 is currently available and only a single processor has requested access to the resource 140, the spinlock 150 will grant the requested access.

However, referring back to step 210, if the resource 140 is not available when the processor 110 makes the access request, the spinlock 150, in step 225, will instruct the processor 110 to spin and/or run interrupts (e.g., another task the processor 110 needs to perform that does not require access to the resource 140). For example, if processor 120 already has access to the resource 140 when the request from processor 110 is received, the spinlock 150 will instruct processor 110 that the resource 140 is not available and that the processor 110 may run interrupts while it is waiting for the resource 140 to become available. In some embodiments, the spinlock 150 will only instruct the processor 110 to run interrupts if the processor 110 has previously requested access to the resource 140 and been denied a number of times which is fewer than a predetermined value; this may insure that the amount of time a given processor waits for access to the resource 140 does not become excessive. It should be noted that while this exemplary method refers to the processor(s) running an interrupt task, they may also perform multiple interrupt tasks while waiting for access to the resource 140.

In step 230, the spinlock 150 will make a continuous determination as to whether the resource 140 has become available, e.g., has processor 120 released the resource 140. When the spinlock 150 determines that the processor 120 has released the resource 140, the spinlock 150 determines whether there are multiple outstanding requests for access to the resource 140 in step 235.

If there is only a single request (e.g., the single outstanding request from the processor 110), the method continues to step 215 where the single outstanding request is granted and the processor 110 gains access to the resource 140 and the spinlock 150 then locks the resource 140 in step 220. It should be noted that as will be described in more detail below, if the processor 110 is busy running an interrupt when the resource 110 becomes available, the spinlock 150 may delay granting access to the processor 110 until the processor 110 becomes available, even if it is the only outstanding request because there may be subsequent requests received from other processors prior to the processor 110 becoming available.

However, if in step 235 it is determined that there are multiple outstanding requests for access to the resource 140, e.g., both processors 110 and 130 have an outstanding request to access the resource 140, the method continues to step 240 where the spinlock 150 may grant access based on a desired policy implemented in the spinlock 150.

For example, a first policy may be to grant access to a processor (or execution thread) that is currently available (e.g., that is not currently running an interrupt). As described above, if the requested resource 140 is not available, the spinlock 150 may instruct the requesting processor that it is able to run interrupts while the processor is waiting for the resource 140. Thus, in the present example, where both processors 110 and 130 are currently waiting for access to the resource 140, the spinlock 150 may have instructed the processors 110 and 130 that they may run interrupts while waiting for access to the resource 140. However, when the resource 140 became available (step 230), the processor 110 may still have been running an interrupt, while the processor 130 may have completed running one or more interrupts or may not have run any interrupts. Thus, the processor 130 may be immediately available to gain access to the resource 140. If such a policy for immediate access is set in the spinlock 150, the spinlock 150 may grant access to the resource 140 by the processor 130, even though the request by processor 110 may have been received earlier. Thus, in this exemplary embodiment, the policy rule is that a processor (or execution thread) that is immediately available will be granted access to the resource 140 when it becomes available.

It can be seen from the above example, that the exemplary embodiments of the present invention allow each spinning processor to run interrupts while spinning, thereby allowing the processor to be more efficient. In addition, with the example policy described above, a processor that is ready to gain access to a resource does not have to wait for access while another requesting processor is busy running interrupts.

A further exemplary policy that may be implemented in the spinlock 150 is that if a requesting processor is skipped because it was not available when the resource 140 previously became available, that processor may be granted priority the next time the resource 140 becomes available. For example, continuing with the example from above, if the processor 110 was skipped in favor of processor 130, the spinlock 150 may include a policy that favors processor 110 the next time that the resource 140 becomes available, e.g., if processor 110 is available the next time the resource 140 becomes available, the processor 110 receives access because it was skipped last time.

In another example, a policy may be set that if a requesting processor is skipped (e.g., processor 110 from the above example), the outstanding request may be deleted or removed from a request queue and the processor may be required to resubmit a new request for access to the resource.

Those skilled in the art will understand that the exemplary embodiments of the present invention allow for any number of access policies to be implemented in the realtime spinlocks depending on the needs or desires of the system in which the spinlock is operating. In addition to the examples provided above, additional examples of access policies may include fairness (e.g., access to the resource may be provided on a round-robin basis), priority based (e.g., processors or execution threads may have priority values and access to the resource may be based on the priority value), or any combination thereof.

Those skilled in the art will understand that other exemplary systems of the present invention may incorporate more elements. For example, other exemplary systems may include multiple resources controlled by spinlocks. In such a system, a processor may be able to wait for more than one spinlock at a time, or may be limited to waiting for a single spinlock. Further, other exemplary systems may include more processors, which may be concurrently waiting for a single locked resource. Systems including a large number of processors may require policies beyond those described above for determining how to handle multiple processors concurrently running interrupts while waiting for access to the same resource.

The following illustrates code in the C programming language for implementing an exemplary realtime spinlock according to the present invention.

```
#define EMPTY           0
#define BUSY            1
#define INTERESTED      2
#define NOBODY         -1
typedef struct
    {
    volatile atomic_t flag;
    unsigned misses;
    unsigned nest;      /* count of nested takes by this CPU */
    unsigned int spin;
    int key;
    int __pad[3]; /* this puts each CPU entry in its own cache line */
    } cpuState;
typedef struct
    {
    volatile atomic_t owner;
    unsigned maxMisses;
    unsigned numCpus;
    int maxSpin;
    int __pad[4]; /* this puts the CPU array on a 32 byte cache line */
    cpuState cpu[32];
    } rtSpinlock __WRS_DATA_ALIGN_BYTES(32);
unsigned rtSpinlockMaxMisses = 5;
unsigned rtSpinlockMaxSpin = 1000;
#define RT_SPINLOCK_NUM_CPUS 4
STATUS rtSpinlockInit(rtSpinlock *sl)
    {
    int i;
    sl->numCpus = RT_SPINLOCK_NUM_CPUS;
    sl->owner = NOBODY;
    sl->maxMisses = rtSpinlockMaxMisses;
    sl->maxSpin = rtSpinlockMaxSpin;
    for (i = 0; i < sl->numCpus; i++)
        {
        sl->cpu[i].flag = EMPTY;
        sl->cpu[i].misses = 0;
        sl->cpu[i].nest = 0;
        sl->cpu[i].spin = 0;
        }
    return (OK);
    }
void rtSpinlockTake
    (
    rtSpinlock *sl
    )
    {
    unsigned myCpu;
    myCpu = vxCpuIndexGet( );
    if (!INT_CONTEXT( ))
        taskCpuLock( );
    sl->cpu[myCpu].key = intCpuLock( );
    sl->cpu[myCpu].spin = 0;
    if (sl->cpu[myCpu].flag == EMPTY)      /* first taker */
        sl->cpu[myCpu].misses = 0;
    ++sl->cpu[myCpu].nest;
    sl->cpu[myCpu].flag = INTERESTED;       /* signal intent */
    if (vxCas(&sl->owner, NOBODY, myCpu) == TRUE)
        return;                            /* CPU took sl->on its own */
    for (;;)
        {
        if (sl->owner == myCpu )
            return;                        /* CPU was given spinlock by other CPU */
        sl->cpu[myCpu].spin ++;
        if (sl->cpu[myCpu].spin > sl->maxSpin)
            {
```

```
        sl->cpu[myCpu].flag = BUSY;         /* wave off */
        intCpuUnlock (sl->cpu[myCpu].key);
            /* run ISRs (they may stomp the key) */
        sl->cpu[myCpu].key = intCpuLock( );
        sl->cpu[myCpu].spin = 0;
        sl->cpu[myCpu].flag = INTERESTED;   /* signal intent */
            /* check if the lock was freed while local CPU was in the
             * BUSY state */
            if (vxCas(&sl->owner, NOBODY, myCpu) == TRUE)
                return;
        }
    }
}
void rtSpinlockGive
    (
    rtSpinlock *sl
    )
    {
    unsigned nextCpu;
    unsigned myCpu;
    myCpu = vxCpuIndexGet( );
    sl->cpu[myCpu].flag = ---sl->cpu[myCpu].nest > 0 ? BUSY : EMPTY;
    do
        {
        nextCpu = (myCpu + 1) % sl->numCpus;
        if (sl->cpu[nextCpu].flag == INTERESTED)
            {
            sl->owner = nextCpu;
            goto CLEANUP;
            }
        if (sl->cpu[nextCpu].flag == BUSY)
            {
            sl->cpu[nextCpu].misses++;
            if (sl->cpu[nextCpu].misses > sl->maxMisses)
                {
                sl->owner = nextCpu;
                goto CLEANUP;
                }
            }
        nextCpu = (nextCpu + 1) % sl->numCpus;
        } while (nextCpu != myCpu);
    sl->owner = NOBODY;          /* fall through into CLEANUP */
CLEANUP:
    intCpuUnlock(sl->cpu[myCpu].key);
    if (!INT_CONTEXT( ))
        taskCpuUnlock( );
    }
```

Those of skill in the art will understand that this code is merely exemplary, and that other programming code, in both C and other programming languages, may also be written to implement realtime spinlocks according to the present invention.

Those skilled in the art will understand that the above described exemplary embodiments may be implemented in any number of manners, including as a separate software module, as a combination of hardware and software, etc. For example, the method 200 may be a program containing lines of code that, when compiled, may be executed by a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:
1. A method, comprising:
receiving a request from a requester for access to a computing resource;
instructing, when the resource is unavailable, the requester to wait for access to the resource, wherein the requester is allowed to perform other tasks while waiting;

determining, at a subsequent availability of the resource, whether the requester is one of unavailable and available;

denying access to the resource by the requester based on the request if the requester is unavailable;

granting access to the resource by the requester based on the request if the requester is available; and prioritizing the requester over a further requester at a further subsequent availability of the resource if access to the resource by the requester was denied based on the requester being unavailable.

2. The method of claim 1, further comprising:
locking the resource when access is granted to the requester.

3. The method of claim 1, further comprising:
receiving a further request from a further requester, wherein the further request is received while the request remains pending;

instructing, when the resource is unavailable, the further requester to wait for access to the resource, wherein the further requester is allowed to perform other tasks while waiting; and granting access to the resource by one of the requester and the further requester based on an access policy.

4. The method of claim 3, wherein the access policy includes:
determining, when the resource subsequently becomes available, which one of the requester and the further requester is available; and granting access to the one of the requester and the further requester that is available.

5. The method of claim 3, wherein the access policy includes:
determining, when the resource subsequently becomes available, if both the requester and the further requester are available.

6. The method of claim 1, wherein the performing other tasks includes the running of interrupts.

7. The method of claim 1, wherein the requester is one of a processor of a multiprocessor arrangement and multiple threads executing on a single processor.

8. A system, comprising:
a computing resource;
a plurality of requesters having controlled access to the resource; and
a spinlocking hardware processor controlling access by the plurality of requesters to the resource, the spinlocking hardware processor receiving a request from a first requester for access to the resource, instructing, when the resource is unavailable, the first requester to wait for access to the resource, wherein the first requester is allowed to perform other tasks while waiting, determining, at a subsequent availability of the resource, whether the first requester is one of unavailable and available, denying access to the resource by the requester based on the request if the first requester is unavailable, granting access to the resource by the first requester based on the request if the first requester is available, and prioritizing the first requester over a second requester at a further subsequent availability of the resource if access to the resource by the first requester was denied based on the first requester being unavailable.

9. The system of claim 8, wherein the spinlocking hardware processor locks the resource when access is granted to the first requester.

10. The system of claim 8, wherein the spinlocking hardware processor receives a second request from a second requester, the second request being received while the request remains pending, instructs, when the resource is unavailable, the second requester to wait for access to the resource, wherein the second requester is allowed to perform other tasks while waiting and grants access to the resource by one of the first and second requesters based on an access policy.

11. The system of claim 10, wherein the access policy provides that when the resource subsequently becomes available and one of the first and second requesters is available, access is granted to the one of the first and second requesters that is available.

12. The method of claim 8, wherein the performing other tasks by the first requester includes the running of interrupts.

13. The method of claim 8, wherein the plurality of requesters includes one of processors of a multiprocessor arrangement and multiple threads executing on a single processor.

14. The system of claim 10, wherein the access policy provides that the one of the first and second requesters that is skipped is granted access the next time the resource becomes available.

15. A system, comprising a hardware memory storing a set of instructions, and a hardware processor executing the set of instructions, the set of instructions, when executed by the hardware processor, causing the hardware processor to perform a method comprising:
receiving a request from a requester for access to a computing resource;
instructing, when the resource is unavailable, the requester to wait for access to the resource, wherein the requester is allowed to perform other tasks while waiting;
determining, at a subsequent availability of the resource, whether the requester is one of unavailable and available;
denying access to the resource by the requester based on the request if the requester is unavailable; and
granting access to the resource by the requester based on the request if the requester is available; and
prioritizing the requester over a further requester at a further subsequent availability of the resource if access to the resource by the requester was denied based on the requester being unavailable.

16. The system of claim 15, wherein the set of instructions are further operable to:
receive a further request from a further requester, wherein the further request is received while the request remains pending;
instruct, when the resource is unavailable, the further requester to wait for access to the resource, wherein the further requester is allowed to perform other tasks while waiting; and
grant access to the resource by one of the requester and the further requester based on an access policy.

* * * * *